March 1, 1938.    H. A. COPE    2,109,859
ANGLER'S IMPLEMENT
Filed June 15, 1936
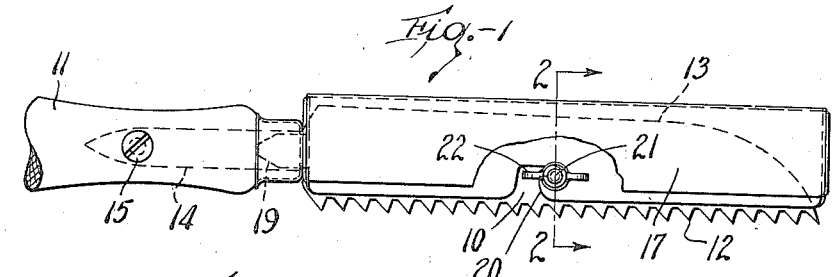
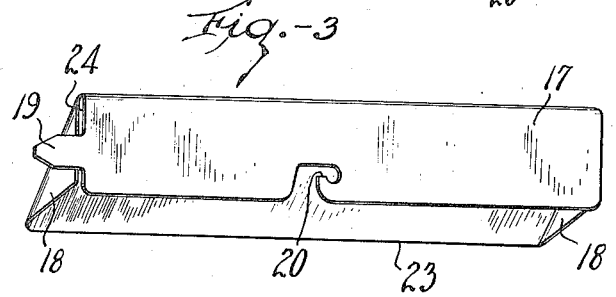
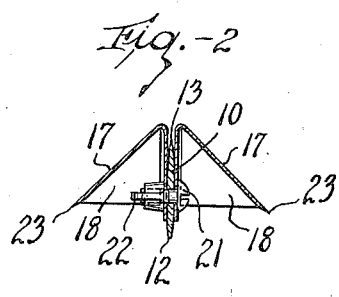
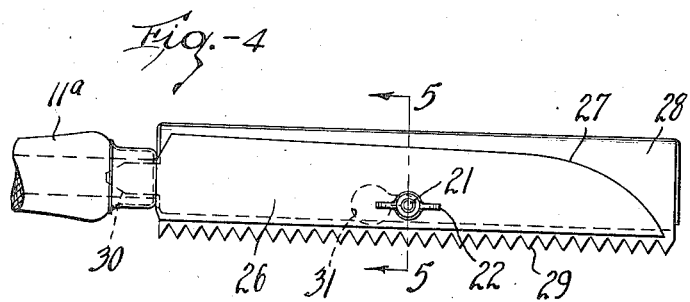
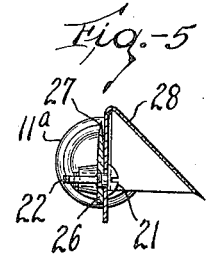
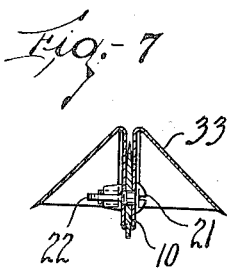
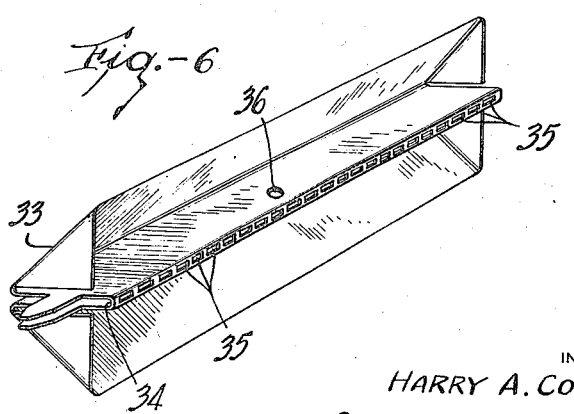
INVENTOR
HARRY A. COPE
BY
Albert L. Ely
ATTORNEY

Patented Mar. 1, 1938

2,109,859

UNITED STATES PATENT OFFICE 2,109,859

ANGLER'S IMPLEMENT

Harry A. Cope, Akron, Ohio, assignor of one-fourth to Edward L. Cope, Akron, Ohio Application June 15, 1936, Serial No. 85,216

9 Claims. (Cl. 17—7)

This invention relates to angler's implements, and more especially it relates to a combination tool that may be used for the scaling, scraping and dressing of fish.

Briefly stated, the improved implement comprises a knife blade, and a member removably associated therewith and so constructed as to constitute a guard to prevent the scattering of fish scales, and also serving as a scraper for removing slime and the like from the scaled fish.

The chief objects of the invention are to provide an implement of the character mentioned that may be used with equal facility by right handed and left handed anglers; to provide such an implement wherein the scale-guard also serves to guard the cutting edge of the knife blade; to provide for the quick and easy mounting and removal of the guard member; and in general to provide an implement for anglers that is useful in a number of situations. Other objects will be manifest as the specification proceeds.

In the accompanying drawing,

Figure 1 is a side elevation of one embodiment of the invention, a part thereof being broken away;

Figure 2 is a section taken on the line 2—2 of Figure 1;

Figure 3 is a perspective view of one of the guard elements of the structure shown in Figure 1;

Figure 4 is a side elevation of another embodiment of the invention;

Figure 5 is a section taken on the line 5—5 of Figure 4;

Figure 6 is a perspective view of another embodiment of the guard element of the implement; and Figure 7 is a transverse section through a blade equipped with the guard element shown in Figure 6.

Referring now to Figures 1 to 3 of the drawing, the invention comprises a cutting member or knife of which 10 is the blade thereof and 11 is a handle removably affixed thereto. The blade 10 has one straight margin that is serrated as shown at 12, said serrations preferably consisting of saw teeth. The other margin of the blade, designated 13, is sharpened and constitutes a cutting edge. One end of the blade is formed with an integral tongue or extension 14 that is receivable in a slot or socket formed in the handle 11, and a set screw 15 may be provided for retaining the said tongue in said socket.

Mounted upon opposite sides of the blade 10 are guard members 17, 17 that are substantially identical except that one is a right hand member and the other is a left hand member. Each guard member 17 is a unitary, sheet metal structure that is bent longitudinally at an acute angle to trough shape, and has integral portions 18, 18 so bent as to constitute end walls for the trough. The guard members 17 are mountable upon opposite sides of the blade 10, and for retaining them in place thereon, that wall of each guard member that abuts the blade is formed at one end with a longitudinally extending tongue or extension 19 that is insertable into the same slot or socket in handle 11 that receives tongue 14 of the blade 10, each of the tongues 19 preferably being somewhat shorter than the tongue 14 and having a somewhat tapered or pointed end or nose as shown. The guard-wall that includes the tongue 19 also is formed with a bayonet slot 20 that opens onto its free edge, substantially medially thereof, said bayonet slot being engageable with a bolt 21 that extends through a suitable aperture in the blade 10 and is provided on one end with a wing nut 22 for easy manipulation.

The arrangement is such that the guard members 17 are easily and quickly removed from the blade simply by loosening the wing nut 22, moving the members toward the front end of the blade, then upwardly to disengage their bayonet slots from the bolt 21, and thereafter moving them forwardly to withdraw their tongues 19 from the handle socket. The tongues have a loose fit in the socket, and because of their tapered ends the guards are readily moved angularly of the blade as described. The series of steps mentioned is reversed in the mounting of the guards on the blade.

When the guards 17 are mounted on the blade 10, the free edges of the sides thereof that abut the blade are disposed above the serrations or teeth 12 of the latter, said teeth thus being exposed and adapted for use in the scaling of a fish. The opposite margins of the same sides of the guards extend beyond the cutting edge 13 of the blade and thus protect said edge from injury, and also prevent said edge from injuring the angler.

The other wall of each guard 17, which extends obliquely at an acute angle from the upper margin of the wall that abuts the blade, has its free margin bluntly sharpened as shown at 23 and thus constitutes a scraper that may be used advantageously for removing slime from fish after they have been scaled. When the blade is vertically positioned, the scraper edges 23 are disposed somewhat above the serrated edge of the blade so that the implement may be somewhat inclined during use.

The implement with the two guards 17 may be used with equal facility by a right handed or left handed person, and prevents scales from flying in all directions, said scales being neatly collected in the trough-like guards. When the guards 17 and bolt 21 are removed, the cutting edge of the blade may be used for dressing fish, and the opposite edge thereof may be used for light sawing operations. Preferably one of the guards 17 is slightly shorter than the other, and the end portions 18 of the longer guard have their free edges somewhat spaced from the adjacent guard-wall, as shown at 24, Figure 3, which arrangement permits nesting of the guards, for economy of space, when they are not in use on the blade. It will be obvious that the implement may be used with only one guard 17 without sacrificing all the advantages inherent in its structure.

The embodiment of the invention shown in Figure 4 and Figure 5 comprises a knife of which 26 is the blade thereof and 11ᵃ is the handle. The blade 26 is mounted on the handle in the manner hereinbefore described, and as shown has its upper margin sharpened to a cutting edge 27, although the opposite margin may be sharpened if desired. Mounted upon one side of the blade 26 is a guard member 28 that is similar in shape to the guard members 17 previously described. It differs primarily from the latter in having the wall that abuts blade 26 of such width as to extend beyond both margins of the blade, the free edge of said guard wall being serrated as shown at 29. The guard 28 has the usual tongue 30 receivable in the socket of handle 11ᵃ, and is secured to the blade 26 by a bolt 21 that extends through apertures in the guard and blade and is provided with a wing nut 22. The bolt-aperture in the guard is designated 31, and is in the form of a closed-end slot that permits longitudinal movement of the guard relatively of the blade when the wing nut is loose, one end of said slot being of larger size so as to pass over the head of bolt 21.

In this embodiment of the invention the serrated margin 29 of the guard is used for the scaling of the fish, the knife blade being accessory thereto and useful only when the guard is removed. Thus by removing the blade from the handle and securing the guard therein the latter may be used alone for the scaling and scraping of the fish.

The embodiment of the invention shown in Figures 6 and 7 differs from that shown in Figure 1 only in the construction of the guard member, the knife blade and handle being identical with those shown in the aforesaid figure. The scale-guard 33 that is mounted upon the blade is a unitary structure in the shape of two guard members 17 that are united by a web 34 along the lowermost margins of the parallel walls thereof that abut opposite faces of the blade. The web 34 is formed with a longitudinally extending series of slots 35, 35 through which the saw teeth 12 of the blade 10 extend. The parallel walls of the guard are formed with respective aligned apertures, such as the aperture 36, for receiving the bolt 21 by which the guard is removably secured to the blade 10.

Other modifications may be resorted to without departing from the spirit of the invention or the scope of the appended claims, which are not limited wholly to the specific construction shown and described.

What is claimed is:

1. An angler's implement comprising a knife including handle and blade, and a scale guard removably mounted thereon, said scale guard consisting of a unitary open trough-like structure of sheet metal having a portion positioned against a flat face of the blade and a portion coextensive therewith and disposed at an acute angle thereto, said blade being disposed exteriorly of the trough.

2. An angler's implement comprising a knife including a handle and blade, and a scale guard removably mounted thereon, said scale guard consisting of a unitary structure of sheet metal having a plane portion positioned against a flat face of the blade and a plane portion coextensive with said first-mentioned plane portion and disposed at an acute angle thereto so as to define an open trough-like structure, said scale guard being so positioned on the blade as to extend laterally beyond the cutting edge of the latter to protect the same and render it ineffective for cutting purposes.

3. An angler's implement comprising a knife including a handle and a blade inserted in a socket in one end thereof, a scale guard removably mounted thereon, said scale guard consisting of a unitary, trough-like sheet metal structure having a portion positioned against a flat face of the blade and formed at one end with an extension insertable into the handle-socket that receives the blade, and a bolt extending through the blade and guard-portion lying thereagainst for securing them to each other.

4. An angler's implement comprising a knife, the blade of which has one margin that is formed with a cutting edge and another margin that is serrated, and a scale guard consisting of a unitary, trough-like structure that is V-shaped in transverse section and is removably mounted upon one side of the blade with its longitudinal opening beside the serrated edge thereof so as to catch fish scales removed thereby, said guard extending beyond the cutting edge of the blade to protect the same.

5. An angler's implement comprising a knife including a handle, and a blade inserted in a socket in one end of the latter, and a pair of scale guards mounted thereon on opposite sides of said blade, each of said scale guards comprising a trough-like sheet metal structure having a portion positioned against the flat face of the blade and formed at one end with a projecting tongue insertable into the handle-socket that receives the blade, and a bolt extending through the blade and through both scale-guard portions abutting the same for retaining both scale guards on the blade.

6. An angler's implement comprising a knife including handle and blade, the latter having a tongue-like extension mounted in a socket in the end of the handle, a scale guard removably mounted thereon, said scale guard consisting of a unitary trough-like structure of which one portion thereof abuts a flat face of the blade and extends laterally beyond both margins thereof, said blade-abutting portions having its free longitudinal margin serrated, and having one end formed with a projecting tongue receivable beside the tongue of the blade in the socket in the handle, and a bolt extending through aligned apertures in the blade and abutting scale-guard portion for securing them in assembled relation.

7. An angler's implement comprising a unitary, open trough-like structure of sheet metal, the sides of which meet at an acute angle, the free margin of one of said sides being serrated and the free margin of the other side having a cutting edge, said sides being adapted for alternative use, and an integral handle portion extending from one end of said structure.

8. An angler's implement comprising a knife of which the blade thereof has one cutting edge and one serrated edge, and a scale guard mountable on said blade and comprising trough-like units disposed on opposite sides of the blade, said units being integrally united to each other by a portion that extends around the serrated edge of the blade and is longitudinally slotted to permit the teeth of the blade to project therethrough.

9. An angler's implement comprising a knife including handle and blade, and a scale guard removably mounted upon one side of said blade, said scale guard consisting of a unitary, trough-like structure that extends longitudinally of the blade with the outer face of one of its sides in abutting relation thereto, said blade-abutting side having both its longitudinal margins projecting beyond the adjacent margins of the blade, one of said projecting margins being serrated.

HARRY A. COPE.